United States Patent [15] 3,653,911

Mancuso et al. [45] Apr. 4, 1972

[54] PROCESS FOR MAKING PRELIGHTENED COFFEE POWDER

[72] Inventors: John J. Mancuso, Astoria, N.Y.; Theodore F. Litchult, Ramsey, N.J.; Herman M. Dolezal, Valley Cottage, N.Y.

[73] Assignee: General Food Corporation, White Plains, N.Y.

[22] Filed: Dec. 3, 1969

[21] Appl. No.: 881,888

[52] U.S. Cl. ....................................99/71, 99/63, 99/DIG. 4
[51] Int. Cl. ..........................................................A23f 1/12
[58] Field of Search....................................99/63, 71, DIG. 4

[56] References Cited

UNITED STATES PATENTS 3,458,319 7/1969 Block et al.................................99/71
2,712,501 7/1955 Hale et al...................................99/71

*Primary Examiner*—Frank W. Lutter
*Assistant Examiner*—William L. Mentlik
*Attorney*—Bruno P. Struzzi, Daniel J. Donovan and Thomas R. Savoie

[57] ABSTRACT

A prelightened coffee composition is made by mixing buffered coffee percolate with a coffee lightener composition and homogenizing the mixture. This mixture is then spray dried to produce a powder consisting of coffee solids and lightener solids, which has retained a high degree of lightening power and which does not exhibit any feathering when dissolved in hot water.

6 Claims, No Drawings

PROCESS FOR MAKING PRELIGHTENED COFFEE POWDER

BACKGROUND OF THE INVENTION

This invention relates to an improved method of making a prelightened coffee powder.

Ordinarily a cup of instant coffee is made by mixing about a teaspoon of soluble coffee powder into a cup of hot water. A coffee drinker who desires to lighten his coffee must add some milk or cream separately. Alternatively, if he desires, he can use one of several powdered non-dairy coffee lighteners which are available to the consumer. But in either case he must keep on hand not only the powdered coffee but also the milk, cream or cream substitute.

Attempts have been made to prepare a dry prelightened coffee mixture but most products have an inferior flavor and do not dissolve readily in water. Additionally when mixed in hot water the resulting beverage exhibits an unsightly appearance, known as "feathering," which is usually caused by the coagulation of the protein component present in the coffee lightener. Products which merely mix soluble coffee solids and lightener solids present an unattractive, speckled, appearance and tend to segregate in the package.

One prior art method for producing, in a single spray drying operation, a prelightened coffee powder which is stated to have good flavor and aroma and also good solubility in hot water is described in U.S. Pat. No. 3,458,319 issued on July 29, 1969 to Block et al. The patent describes a process wherein a liquid coffee percolate is added to a liquid non-dairy coffee lightener and homogenized to form a lightener-coffee blend, which blend is then cooled and spray dried to yield a powdered mixture. The powder mixture is then agglomerated, dried and tempered to produce a dry prelightened coffee powder.

One drawback to this spray drying process of the Block et al. Patent is that, due to a loss in lightening power, an inordinately large amount of non-dairy coffee lightener solids, in relation to the amount of coffee solids, must be used to produce coffee beverage of suitable lightness. It has been found that in order to produce a commercially acceptable product by the Block et al. process the non-dairy lightener solids must be present in the mixture in a ratio to the coffee solids of greater than 3 to 1.

It is an object of this invention to permit the preparation of prelightened coffee at ratios of non-dairy lightener solids to coffee solids of 3 to 1 or less.

More specifically, it is an object of this invention to permit the preparation of a spray dried prelightened coffee powder having a composition in the range of 1.5 to 2 parts lightener solids to 1 part coffee solids.

These and other objects and advantages of the invention will become apparent from the description herein.

DESCRIPTION OF THE INVENTION

In general this invention relates to an improved process for making dry prelightened coffee powder wherein there is little or no loss in lightening power. Lightening power is the ability of the lightener to produce a coffee beverage which possesses a golden hue similar to that obtained by adding cream to a cup of "black" coffee. By loss in lightening power is meant the failure of the lightening solids present in the spray dried prelightened coffee powder to lighten the coffee beverage as much as an equal amount of lightening solids directly added to a cup of "black" coffee. Loss in lightening power is thought to be attributed to a breakdown of the fat emulsion present in a coffee lightener when the lightener is blended and spray dried with a coffee percolate.

The lightening effect desired in the final coffee beverage is primarily attributed to the fat component of the lightener formulation; however, the fat must be in an emulsified state if proper lightening is to occur. Thus a stable fat emulsion in both the liquid lightener and in the lightener-coffee blend is necessary in order to retain lightening power in the prelightened coffee powder.

In general the process of this invention includes the steps of adding a liquid coffee percolate to a lightener, homogenizing the mixture to form a stable lightener-coffee blend and spray drying this blend to produce a dry powder. The lightener used in this invention may be in the form of a liquid or a soluble powder. Contrary to the disclosure of the Block et al. Patent, it has now been found, and it is a critical step in the process of this invention, that at least some of the buffering agents (e.g. di potassium phosphate, sodium tripolyphosphate, etc.) normally present in the lightener should be added instead to the coffee percolate. This process yields a powder which retains a large degree of its lightening power. If desired the dry prelightened coffee powder of this invention can be agglomerated and tempered as taught in the aforementioned Block et al. Patent.

As previously suggested, emulsion stability of the lightener-coffee blend prior to spray drying and retention of as much stability as possible across the spray dryer is required for the prelightened coffee powder to retain satisfactory lightening power. To assist in stabilizing the emulsion, coffee lighteners normally include as the protein ingredient a water dispersible protein having emulsifying properties such as sodium caseinate, calcium caseinate, potassium caseinate, soybean proteinate, etc. It has been found that when a liquid non-dairy coffee lightener (of approximate pH 7.4) is mixed with a liquid coffee percolate (of approximate pH 4.6) localized areas of the mixture will drop to a pH of 4.8. At this pH value the protein ingredient dispersed in the coffee lightener will tend to coagulate and yield a flocculent residue which detracts from the emulsion stability of the lightener-coffee blend and which does not permit adequate homogenization of the blend. The protein coagulation results from the fact that the isoelectric point, the point of minimum solubility based on pH values, of the protein ingredient (approximately 4.5 for casein) is approached in the aforementioned localized areas. And since the molecules of protein ingredient dispersed in the lightener help to maintain a stable fat emulsion, when coagulation of the protein occurs the fat emulsion will tend to break down. This breakdown in the emulsion will prevent the lightener-percolate blend from being completely homogenized prior to spray drying and the resultant powdered product will cup to a coffee beverage which exhibits oil droplets on the surface as well as "feathering" of the coagulated protein.

According to this invention the buffering ingredients normally present in the lightener are at least in part added to the coffee percolate, typically raising the pH of the aforementioned percolate to about 5.4 while the pH of the aforementioned liquid lightener drops to about 6.7. These changes in pH permit the mixing of coffee percolate and lightener while maintaining in all areas a pH sufficiently above the isoelectric point of the protein ingredient to prevent coagulation. Under these conditions the mixture can be homogenized to form a homogeneous blend having a very stable fat emulsion.

The following examples are given as illustrative of the present invention without, however limiting the same to the specific details of the examples.

The non-dairy lightener solids used in the examples lb. this invention has essentially the following formulation:

| Ingredient | |
|---|---|
| Frodex (24 DE corn syrup solids) | 10.64 |
| Vegetable Fat (Wecobee S)* | 6.72 |
| Sodium Caseinate | 1.10 |
| Gum Stabilizer (Stabilizer CC603)* | 0.41 |
| Monoglyceride Emulsifier (Drewmulse 70)* | 0.41 |
| Flavor Agents | 0.05 |
| Sodium Tripolyphosphate | 0.52 |
| Dipotassium Phosphate | 0.26 |
| | 20.11 |

*Supplied by Drew Chemical Corp.

In the above formulation the vegetable fat, Wecobee S, is a synthetic cocoa butter; the gum stabilizer, Stabilizer CC603 is a mixture of guar gum, carrageenin and dextrose; and the emulsifier, Drewmulse 70, is a monoglyceride derived from coconut oil. The flavor agents may include any of the commercially available cream flavoring compositions as well as various coloring agents. Sodium tripolyphosphate and dipotassium phosphate are buffering agents the weights of which are included as part of the lightener solids but which are separately dissolved in the coffee percolate.

EXAMPLE I

Employing the ingredients and amounts listed above, the corn syrup solids, sodium caseinate, stabilizer, and flavor agents are added to and mixed for 10 minutes with 35 lbs. of spring water which has been heated to 190° F. The vegetable fat is melted at 170° F. together with the emulsifier and this fat-emulsifier melt is added to the still warm water mixture and stirred for 5 minutes to form the lightener solution. The sodium tripolyphosphate and dipotassium phosphate buffering agents are separately dissolved in 5 lbs. of water. This water-buffer solution is now mixed for 2 minutes at 155° F. with sufficient coffee percolate (50 lbs. at 26.7 percent solids) to obtain a lightener solids to coffee solids ratio of 1.5 to 1. The lightener solution and buffered percolate are mixed and then homogenized by four passes through a Manton-Gaulin homogenizer at 3,300 psig. The resulting homogenized blend contains a stable fat emulsion for periods of at least 18 hours and when spray dried the resulting powder cups to a commercially acceptable coffee beverage having a good taste, sufficient lightness, and absence of feathering and oiling.

EXAMPLE 2

The procedure of Example 1 is followed except that sufficient coffee percolate (approximately 37.5 lbs. at 26.7 percent solids) to obtain a lightener solids (including weight of buffer salts) to coffee solids ratio of 2 to 1 is used. The spray dried powder of this example cups to a commercially acceptable coffee beverage having good taste, good lightness, and absence of feathering and oiling.

EXAMPLE 3

The procedure of Example 1 is followed except that sufficient coffee percolate (approximately 25 lbs. at 26.7 percent solids) to obtain a lightener solids (including weight of buffer salts) to coffee solids ratio of 3 to 1 is used. The spray dried powder of this example cups to a commercially acceptable coffee beverage having good taste, excellent lightness and absence of feathering and oiling.

Although we have mentioned only coffee in the specification the same process may be used for prelightening certain other beverages such as tea.

It will be apparent that there are variations and modifications of this invention and that the samples, preferred proportions and ingredients, and typical operating procedures may be varied without departing from the spirit of the invention.

What is claimed is:

1. In a process for producing a powdered prelightened coffee composition by spray drying a blend of a non-dairy lightener and a coffee percolate, the improvement comprising adding at least part of the buffering agents, which are normally present in the lightener, to the coffee percolate instead, said buffering agents being added to the percolate in an amount sufficient to raise the pH of the percolate to a point which permits the formation of a homogeneous blend, and blending the buffered percolate with the non-dairy lightener, the ratio of lightener solids to coffee solids being 3 to 1 or less.

2. The process according to claim 1 wherein the ratio of lightener solids to coffee solids is 2 to 1 or less.

3. The process according to claim 2 wherein the ratio is about 1.5 to 1.

4. The process according to claim 1 wherein all the buffering agents normally present in the lightener are added to the percolate.

5. The process according to claim 4 wherein the powdered composition is agglomerated.

6. The process according to claim 5 wherein the coffee lightener is in a liquid state.

* * * * *

UNITED STATES PATENT OFFICE
CERTIFICATE OF CORRECTION

Patent No. 3,653,911 Dated April 4, 1972

Inventor(s) Mancuso et al.

It is certified that error appears in the above-identified patent and that said Letters Patent are hereby corrected as shown below:

At column 2, line 57, "lb." should read --of--; column 2, about line 62, the term --lbs.-- should be inserted as the heading for the numerical column.

Signed and sealed this 24th day of October 1972.

(SEAL)
Attest:

EDWARD M.FLETCHER,JR.
Attesting Officer

ROBERT GOTTSCHALK
Commissioner of Patents